(12) United States Patent
Prichard et al.

(10) Patent No.: US 7,080,805 B2
(45) Date of Patent: Jul. 25, 2006

(54) STIFFENED STRUCTURES AND ASSOCIATED METHODS

(75) Inventors: Alan K. Prichard, Seattle, WA (US); S. Douglas Friddell, Seattle, WA (US)

(73) Assignee: The Boeing Company, Seattle, WA (US)

( * ) Notice: Subject to any disclaimer, the term of this patent is extended or adjusted under 35 U.S.C. 154(b) by 155 days.

(21) Appl. No.: 10/839,573

(22) Filed: May 5, 2004

(65) Prior Publication Data

US 2005/0247818 A1  Nov. 10, 2005

(51) Int. Cl.
*B64C 1/00* (2006.01)

(52) U.S. Cl. .............................. 244/117 R; 244/123.1; 244/131; 244/132

(58) Field of Classification Search ............... 244/123, 244/117 R, 119, 133, 132, 131
See application file for complete search history.

(56) References Cited

U.S. PATENT DOCUMENTS

| | | | |
|---|---|---|---|
| 183,160 A | 10/1876 | Haughian | |
| 2,997,262 A * | 8/1961 | Kirk et al. ............. | 244/123.12 |
| 4,012,549 A | 3/1977 | Slysh | |
| 4,628,402 A * | 12/1986 | Covey ........................ | 361/218 |
| 5,216,799 A * | 6/1993 | Charnock et al. ........ | 29/525.02 |
| 5,505,030 A | 4/1996 | Michalcewiz | |
| 5,657,595 A | 8/1997 | Fyfe | |
| 5,814,137 A | 9/1998 | Blohowiak | |
| 5,849,110 A | 12/1998 | Blohowiak | |
| 5,869,140 A | 2/1999 | Blohowiak | |
| 5,869,141 A | 2/1999 | Blohowiak | |
| 5,939,197 A | 8/1999 | Blohowiak | |
| 5,958,578 A | 9/1999 | Blohowiak | |
| 6,037,060 A | 3/2000 | Blohowiak | |
| 6,190,484 B1 * | 2/2001 | Appa ......................... | 156/189 |
| 6,224,020 B1 | 5/2001 | Hopkins | |
| 6,394,394 B1 | 5/2002 | Raun | |
| 6,718,713 B1 * | 4/2004 | McKague et al. ....... | 52/309.13 |
| 2002/0053175 A1 | 5/2002 | McKague, Jr. et al. | |
| 2004/0055248 A1 | 3/2004 | Grillos | |
| 2004/0075027 A1 | 4/2004 | Friddell | |
| 2004/0236454 A1 * | 11/2004 | Weisser ...................... | 700/123 |

* cited by examiner

*Primary Examiner*—Galen Barefoot
(74) *Attorney, Agent, or Firm*—Perkins Coie LLP

(57) ABSTRACT

Stiffened structures and associated methods are disclosed. In one embodiment, an elongated metallic stiffening member can be attached to a composite sheet and positioned to resist bending of the composite sheet. In another embodiment, a structural system can include an elongated composite element attached between a composite sheet and a metallic stiffening member. In still another embodiment, the structural system is formed without attaching a honeycomb stiffening arrangement.

45 Claims, 5 Drawing Sheets

STIFFENED STRUCTURES AND ASSOCIATED METHODS

TECHNICAL FIELD

The following disclosure relates generally to stiffened structures and associated methods, for example, a composite sheet stiffened with an elongated metallic stiffening member.

BACKGROUND

Aircraft and other vehicles typically include external surfaces formed from panels, sheets, or plates. Because the panels alone are typically too weak to withstand operational loads, they are strengthened by adding honeycomb cores (e.g., between two composite sheets) and/or other stiffeners or supports. For example, aluminum panels can be strengthened with aluminum supports, and composite panels (which may be lighter weight) are typically strengthened with composite supports. FIG. 1 is a partially schematic, isometric view of a composite structure 1 that includes a composite sheet 2 strengthened by composite supports 3, in accordance with the prior art. One drawback with this arrangement is that the composite supports 3 can be expensive to produce. Additionally, it is sometimes difficult to tailor the characteristics of the composite structure 1 to meet the structural requirements of a particular design.

SUMMARY

The present invention is directed generally toward stiffened structures and associated methods. One aspect of the invention is directed toward a structural system that includes a composite sheet having a first surface facing a first direction and a second surface facing a second direction at least approximately opposite the first direction. The system can further include an elongated metallic stiffening member attached to the first surface of the composite sheet and positioned to resist bending of the composite panel. The system can still further include an elongated composite element attached to the metallic stiffening member. In other aspects of the invention, the metallic stiffening member can be elongated along an axis and at least a portion of the metallic stiffening member extending generally along the axis and at least approximately perpendicular to the first surface of the composite sheet can describe a sinusoidal shape.

Another aspect of the invention is directed toward a structural system that includes a composite sheet having a first surface facing a first direction and a second surface facing a second direction at least approximately opposite the first direction. The composite sheet does not have an attached honeycomb stiffening arrangement. The system can further include an elongated metallic stiffening member having at least one web and at least one transverse flange. The elongated metallic stiffening member can be attached to the first surface of the composite sheet and positioned to resist bending of the composite sheet. In a further aspect of the invention, the composite sheet can include a first composite sheet and a second composite sheet can be attached to the elongated metallic member opposite the first composite sheet.

Other aspects of the invention are directed toward methods for producing a structural system. One method includes providing a composite sheet having a first surface facing a first direction and a second surface facing a second direction at least approximately opposite the first direction. The method can further include positioning an elongated metallic stiffening member at least proximate to the first surface of the composite sheet, and attaching the metallic stiffening member to the first surface of the composite sheet. The method can still further include attaching an elongated composite element to the metallic stiffening member. In still other aspects, the method can further include forming a vehicle that includes the composite sheet and the elongated metallic stiffening member.

DETAILED DESCRIPTION

The present disclosure describes stiffened structural systems and associated methods. Several specific details of the invention are set forth in the following description and in FIGS. 2–8 to provide a thorough understanding of certain embodiments of the invention. One skilled in the art, however, will understand that the present invention may have additional embodiments, and that other embodiments of the invention may be practiced without several of the specific features explained in the following description.

Figure 1:
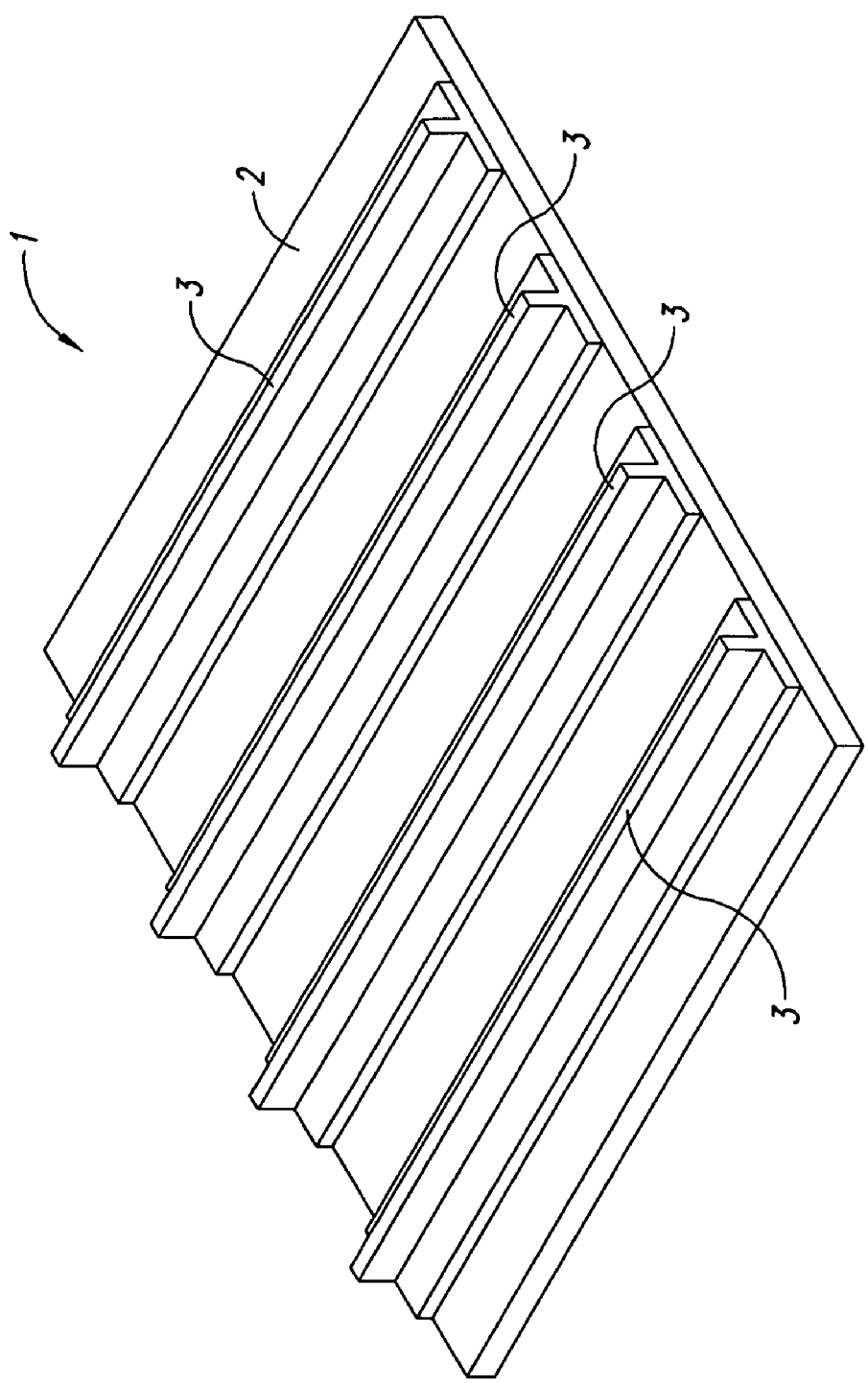
FIG. 1 is a partially schematic, isometric view of a structure that includes a composite sheet and composite supports in accordance with the prior art.
Figure 2:
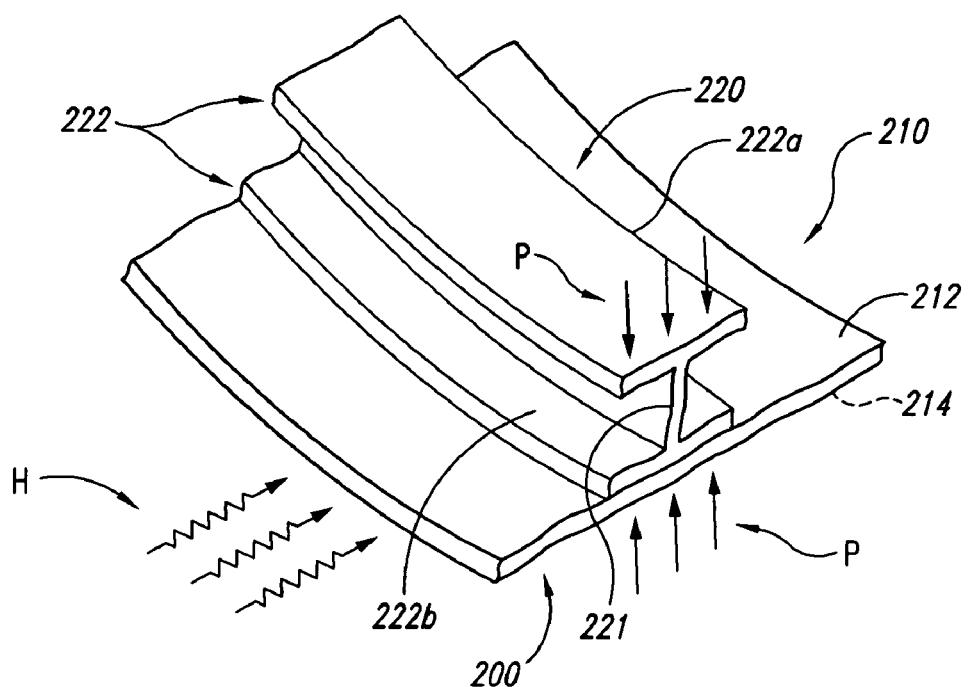
FIG. 2 is a partially schematic, isometric view of a structural system having a curved composite sheet and an elongated metallic stiffening member in accordance with an embodiment of the invention.

FIG. 2 is a partially schematic, isometric view of a structural system 200 having a composite sheet 210 (e.g., a curved composite sheet) attached to an elongated metallic stiffening member 220 in accordance with an embodiment of the invention. The composite sheet 210 can have a first surface 212 facing in a first direction and a second surface 214 facing in a second direction at least approximately opposite the first direction. In a particular aspect of this embodiment, the composite sheet 210 does not have an attached honeycomb stiffening arrangement.

The elongated metallic stiffening member 220 (e.g., a stiffener) can include at least one web 221 and at least one transverse flange 222. One web 221 and two flanges 222a, 222b are shown in FIG. 2. In other embodiments, the metallic stiffening member 220 can have more or fewer web(s) 221 and/or flange(s) 222, and/or other arrangements (e.g., different shapes and/or different angles created by the junction of the webs 221 and flanges 222). The elongated metallic stiffening member 220 can be attached to the first surface 212 of the composite sheet 210 and positioned to resist bending of the composite sheet 210. Because the metallic stiffening member 220 can be less expensive to produce than existing composite stiffeners, this arrangement can reduce the overall cost of the structural system 200.

The composite sheet 210 can be formed from a carbon fiber material or other composite material, and the elongated metallic stiffening member 220 can be formed from titanium, aluminum, or other metallic materials. The structural system 200 can be formed by conforming the metallic stiffening member 220 to at least a portion of the first surface 212 (e.g., if the first surface 212 is curved). The elongated metallic stiffening member 220 can be positioned at least proximate to the first surface of the composite sheet 210 and then attached. In other embodiments, the composite sheet 210 can be generally flat, eliminating the need to conform the elongated metallic stiffening member 220 to a curved surface.

The metallic stiffening member 220 can be attached to the first surface 212 of the composite sheet 210 by various devices, including adhesives (e.g., an epoxy or a resin). For example, in some embodiments at least one adhesive can attach the elongated metallic stiffening member 220 to the composite sheet 210 in a generally continuous manner (e.g., by forming a generally continuous adhesive strip). In other embodiments, at least one adhesive can attach the elongated metallic stiffening member 220 to the composite sheet 210 in a less than continuous manner (e.g., by forming spaced-apart adhesive segments).

When adhesives are used to attach the elongated metallic stiffening member 220 to the composite sheet 210, they can be cured to strengthen the resulting adhesive bond. For example, in one embodiment heat H can be used to cure the adhesive. In another embodiment, an adhesive can be applied between the metallic stiffening member 220 and the composite sheet 210 and a vacuum bagging process can be used to apply pressure P to the metallic stiffening member 220 while the heat H is also applied. In another embodiment, the vacuum bag can be vented to atmospheric pressure during the heating process.

In certain embodiments, the metallic stiffening member 220 can be treated prior to being attached to the composite sheet 210. In particular, the metallic stiffening member 220 can be cleaned (for example, with an aqueous degreaser), etched (for example, with a nitric fluoride solution), conditioned, and/or rinsed. The metallic stiffening member 220 can then be treated with a conversion coating, such as Sol-Gel, available from the assignee of the present invention or Advance Chemistry and Technology of Garden Grove, Calif. The composite sheet 210 can include carbon fiber prepreg materials, such as are available from Toray Composites (America) Inc. of Tacoma, Wash. The metallic stiffening member 220 can be positioned proximate to the composite sheet 210 and the entire assembly can be vacuum bagged. The assembly can then be cured in an autoclave at 350° for two hours, attaching the metallic stiffening member 220 to the composite sheet 210 with the resin from the prepreg. Further details of aspects of the foregoing materials and processes are disclosed in the following U.S. Patents, all of which are incorporated herein in their entireties by reference: U.S. Pat. Nos. 6,394,394; 6,224,020; 6,037,060; 5,958,578; 5,939,197; 5,869,141; 5,869,140; 5,849,110; and 5,814,137.

Figure 3:
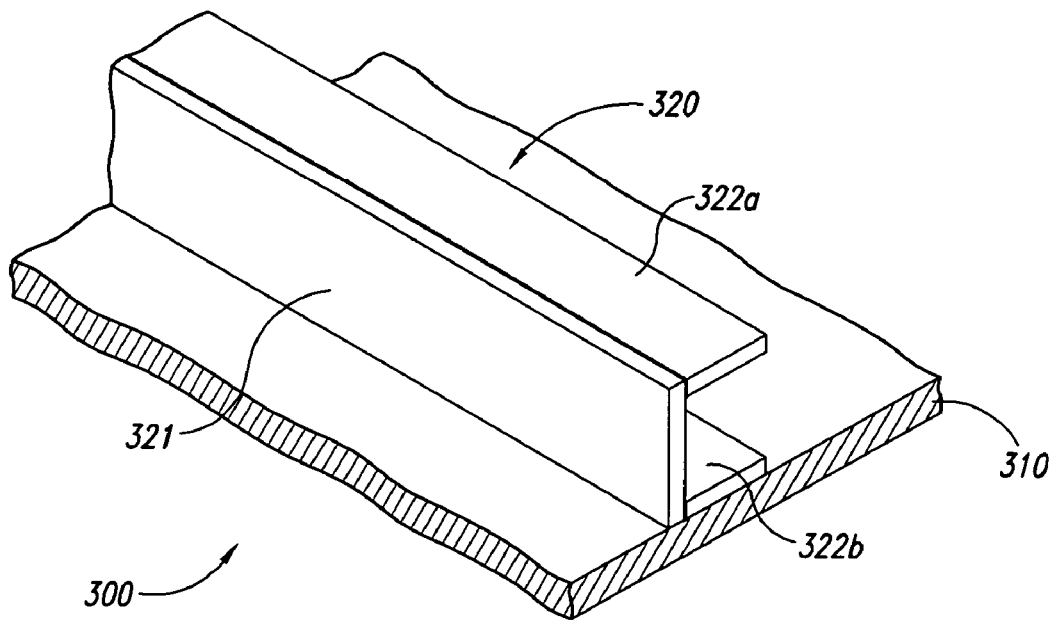
FIG. 3 is a partially schematic, isometric view of a structural system having a composite sheet and an elongated metallic stiffening member that includes multiple metallic portions in accordance with another embodiment of the invention.

FIG. 3 is a partially schematic, isometric view of a structural system 300 having a composite sheet 310 and an elongated metallic stiffening member 320 that includes multiple metallic portions in accordance with another embodiment of the invention. The multiple metallic portions can be oriented to provide specific structural characteristics (e.g., to resist bending loads applied in a certain direction). For example, the metallic stiffening member 320 can include three portions joined together to form a "C" section stiffener. A first portion can form a web section 321, a second portion can from a first transverse flange 322a, and a third portion can form a second transverse flange 322b to complete the "C" section stiffener. The metallic portions can be coupled together using any of a variety of methods, for example, brazing or welding. In other embodiments, the metallic stiffening member 320 can have more or fewer portions, and/or can form other shapes (e.g., an "L" section having a single web and a single transverse flange).

One feature of systems in accordance with embodiments of the invention described above with reference to FIGS. 2–3 is that they can include an elongated metallic stiffening member attached to a composite sheet to stiffen the composite sheet. The elongated metallic stiffening member can be less expensive to produce than a composite support that performs a similar function. Additionally, the elongated metallic stiffening members can be less expensive than a honeycomb arrangement. Accordingly, an advantage of this feature is that it can reduce the overall cost of the system.

Another feature of the foregoing embodiments is that certain characteristics of the system can be more easily tailored when an elongated metallic member is used to stiffen a composite sheet than when composite supports and/or honeycomb arrangements are used to stiffen a composite sheet. For example, carbon fiber provides good tensile strength, good shear strength, and good impact resistance. Titanium is excellent at resisting compressive forces. Accordingly, when a titanium member stiffens a carbon fiber sheet, the arrangement can provide a structure that resists certain compressive forces better than a carbon fiber sheet stiffened with a carbon fiber support. An advantage of this feature is that the desired characteristics of the resulting structure can be more easily and more precisely tailored than can the characteristics of a composite sheet reinforced with a composite stiffener. A further advantage is that the resulting structure can combine the benefits of a composite sheet with the benefits of a metallic stiffener.

Figure 4:
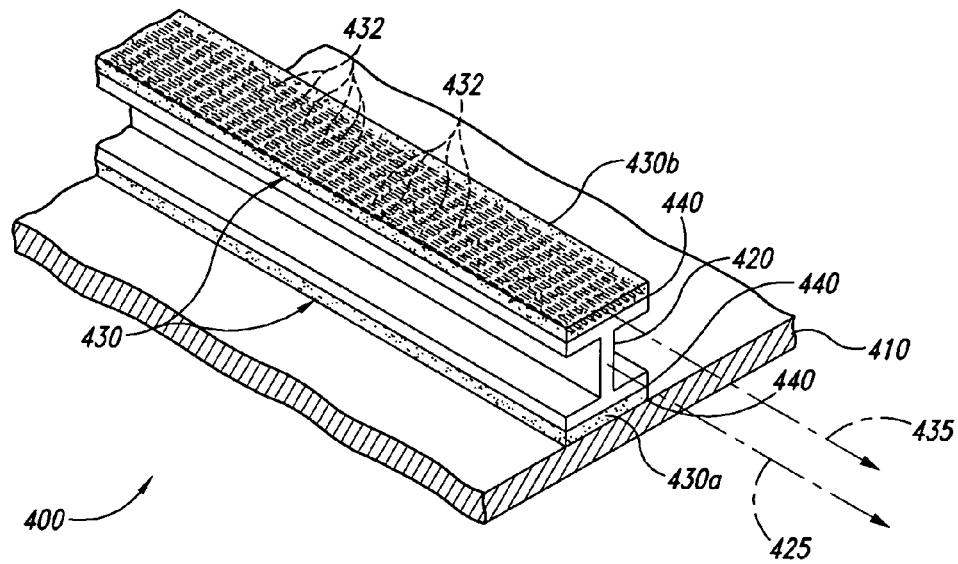
FIG. 4 is a partially schematic, isometric view of a structural system having a composite sheet, an elongated metallic stiffening member, and two elongated composite elements in accordance with a further embodiment of the invention.

Elongated composite elements can be added to the structures described above to further tailor the mechanical characteristics of the structures. For example, as shown in FIG. 4, a structural system 400 can include a composite sheet 410, an elongated metallic stiffening member 420 and one or more elongated composite elements 430 attached to the metallic stiffening member 420. In FIG. 4, the system 400 includes two elongated composite elements 430 (shown as a first elongated composite element 430*a* and a second elongated composite element 430*b*) attached to opposite surfaces of the metallic stiffening member 420. In other embodiments, the system 400 can have more or fewer elongated composite elements 430, and/or the elongated composite element(s) 430 can be attached to other surface(s) of the metallic stiffening member 420.

The characteristics of the elongated composite element(s) 430 combined with the characteristics of the metallic stiffening member 420 can create desired structural characteristics that can be used to resist bending at selected location of the composite sheet 410. For example, the elongated composite element(s) 430 can be located on a portion of the metallic stiffening member 420 such that the ability of the combined structure (the metallic stiffening member 420 and the elongated composite element(s) 430) to resist bending in a certain direction is increased. This combined structure can then be located and oriented on the composite sheet 410 to support predicted loads. In certain embodiments, the elongated composite element(s) 430 can be made of the same material as the composite sheet 410 and can be located and/or oriented on the metallic stiffening member 420 to provide the desired structural characteristics. In other embodiments, the elongated composite element(s) 430 can include other materials.

In some embodiments, the elongated composite element(s) 430 can include filaments that are oriented in selected directions relative to the metallic stiffening member 420. For example, when the metallic stiffening member 420 is elongated along a first axis 425 and the second elongated composite element 430*b* is elongated along a second axis 435, the second elongated composite element 430*b* can include filaments 432 (e.g., fibers or wires) that are oriented generally parallel to the second axis 435. The second elongated composite element 430*b* can be attached to the metallic stiffening member 420 so that the first axis 425, the second axis 435 and the filaments 432 are all generally parallel, providing a selected set of structural characteristics. In other embodiments, the filaments 432 can be oriented so that they are not parallel to the second axis 435. Accordingly, the second elongated composite element 430*b* can be attached to the metallic stiffening member 420 so that the first axis 425 and the filaments 432 are not parallel (e.g., the filaments 432 can run 90 degrees to the first axis 425), providing different set of structural characteristics.

The elongated composite element 430*a* can be adhesively attached to the composite sheet 410. For example, the first elongated composite element 430*a* can be positioned between the composite sheet 410 and the metallic stiffening member 420 and attached to the metallic stiffening member 420 with one or more adhesives 440. The same and/or different adhesive(s) 440 can be used to attach the first elongated composite element 430*a* to the composite sheet 410. The second elongated composite element 430*b* can also be attached to the metallic stiffening member 420 using one or more of the same or different adhesives 440. An adhesive curing process, as discussed above with reference to FIG. 2, can be used to cure one or more of the adhesives.

In other embodiments, the elongated composite element 430*a* can be attached to the composite sheet 410 when the composite sheet 410 is produced. For example, the elongated composite element 430 can be attached to the composite sheet 410 with resin during a lay-up process used to produce the composite sheet 410, becoming integral with the composite sheet, and the metallic stiffening member 420 can be adhesively attached to the metallic stiffening member 430 at a later time. In some embodiments, the portion of the elongated composite element 430 that attaches to the metallic stiffening member 420 can be elevated above the surface plane of the composite sheet 410. In other embodiments, the elongated composite element 430 can be recessed into the composite sheet 410 so that the portion of the elongated composite element 430 that attaches to the metallic stiffening member 420 is even with or below the surface plane of the composite sheet 410 (e.g., when the elongated composite element 430 includes a different material than the used in the composite sheet 410 and/or includes a material oriented differently than the material in the composite sheet 410).

A feature of embodiments described above with reference to FIG. 4 is that the elongated composite elements can further tailor the structural characteristics of the system. For example, the filaments 432 can be selected to include carbon and boron fibers (boron fibers have good tensile strength) to increase the tensile strength of certain portions of the system. An advantage of this feature is that the desired characteristics of the system can be more easily and more precisely tailored with the addition of the filaments 432 to the metallic stiffening member 420 than can the characteristics of a conventional combination of a composite support and a composite sheet. A carbon boron fiber material (having carbon and boron fibers) known as Hy-Bor® is available from Specialty Materials, Inc. of Lowell, Mass.

Figure 5A:
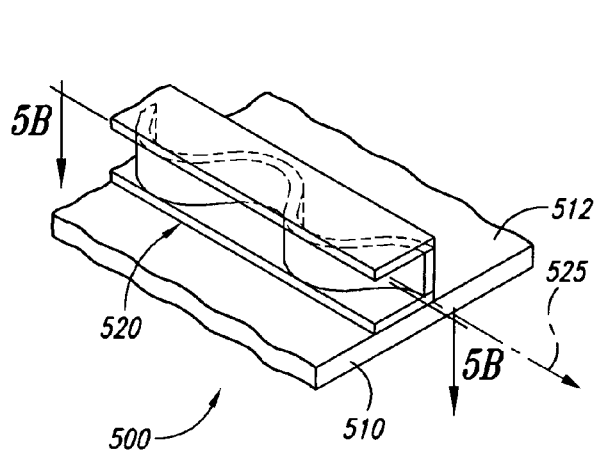
FIG. 5A is a partially schematic, isometric view of a structural system having a composite sheet and an elongated metallic stiffening member having a sinusoidally shaped portion in accordance with another embodiment of the invention.
Figure 5B:
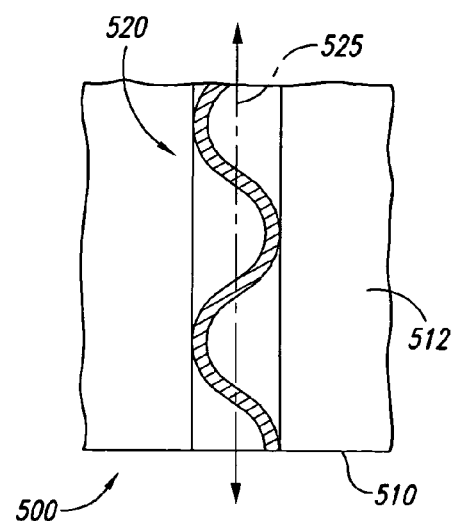
FIG. 5B is a partially schematic cross-sectional plan view of the structural system shown in FIG. 5A.

FIG. 5A illustrates a structural system 500 having a composite sheet 510 and an elongated metallic stiffening member 520 that describes a non-linear (e.g., sinusoidal) shape in accordance with another embodiment of the invention. FIG. 5B is a cross-sectional plan view of the structural system 500 taken along line 5B—5B of FIG. 5A. Referring to FIGS. 5A and 5B together, the metallic stiffening member 520 can be elongated along an axis 525 and can extend at least approximately perpendicular to the first surface 512 of the composite sheet 510. The metallic stiffening member 520 can extend in and out of a plane extending along the axis 525, perpendicular to the first surface 512. For example, the elongated metallic stiffening member 520 can describe a sinusoidal shape, which can add stability to the metallic stiffening member 520 and therefore the system 500.

Figure 6A:
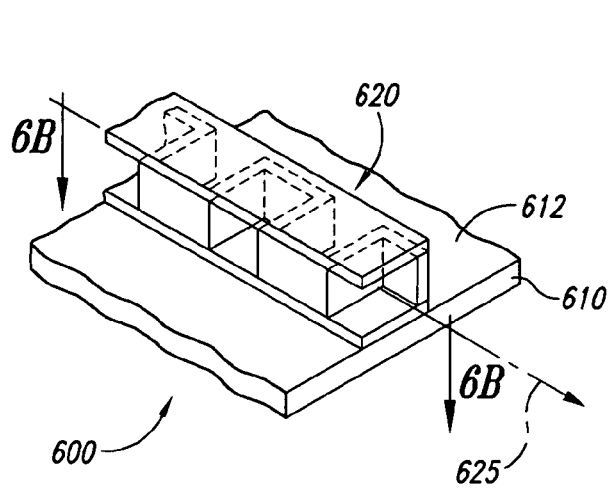
FIG. 6A is a partially schematic, isometric view of a structural system having a composite sheet and an elongated metallic stiffening member in accordance with yet another embodiment of the invention.
Figure 6B:
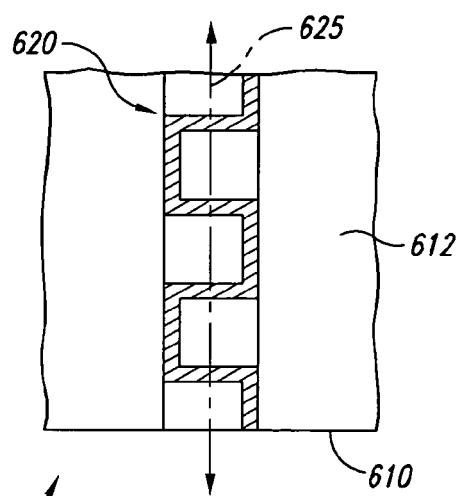
FIG. 6B is a partially schematic cross-sectional plan view of the structural system shown in FIG. 6A.

In other embodiments, the metallic stiffening member can have other shapes. For example, FIG. 6A illustrates a structural system 600 that includes a composite sheet 610 and an elongated metallic stiffening member 620 having a square-wave shape. FIG. 6B is a cross-sectional plan view of the structural system 600 taken along line 6B—6B of FIG. 6A. The square-wave shape can stabilize the metallic stiffening member 620. In other embodiments, the metallic stiffening member can have still further cross-sectional shapes (e.g., a triangular wave shape).

A feature of embodiments of systems described above with reference to FIGS. 5A–6B is that they can include metallic stiffening members that are elongated along an axis and that have shapes that extend into and out of a flat plane extending along the axis. These stiffening members can have increased stability over supports that do not have such a shape. An advantage of this feature is that they can be less likely to buckle under certain loads.

Figure 7A:
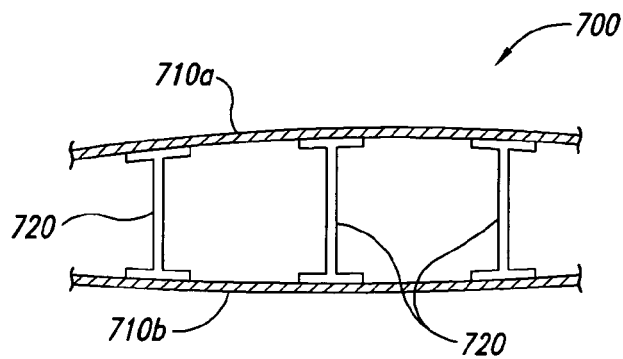
FIG. 7A is a partially schematic cross-sectional view of a structural system having a first composite sheet, multiple elongated metallic stiffening members, and a second composite sheet in accordance with a further embodiment of the invention.
Figure 7B:
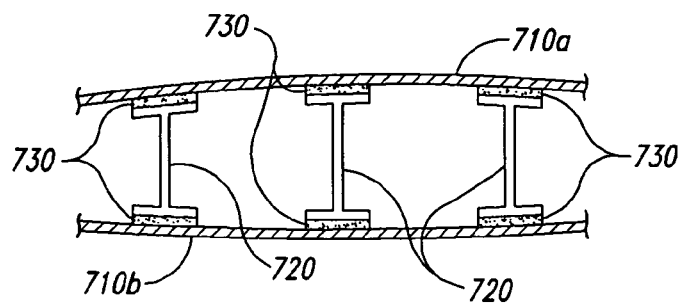
FIG. 7B is a partially schematic cross-sectional view of a structural system having first and second composite sheets, multiple elongated metallic stiffening members, and multiple elongated composite elements in accordance with a still further embodiment of the invention.

A structural system 700 shown in FIG. 7A can include one or more elongated metallic stiffening members 720 attached to a first composite sheet 710*a* and a second sheet 710*b* (e.g., a second composite sheet). In another embodiment shown in FIG. 7B, the metallic stiffening members 720 can be attached to the first and second composite sheets 710*a*, 710*b* with elongated composite elements 730 between at least some of the metallic stiffening members 720 and the first and/or second composite sheet(s) 710*a*, 710*b*. In both embodiments, the first sheet 710*a* can be used to form a first surface of an aircraft airfoil (e.g., an upper surface of a wing section). The second sheet 710*b* can be used to form a second surface of an aircraft airfoil (e.g., a lower surface of the wing section). The metallic stiffening members 720 can extend from the root of the wing to the tip of the wing, serving as both stiffening members and as wing spars.

Figure 8:
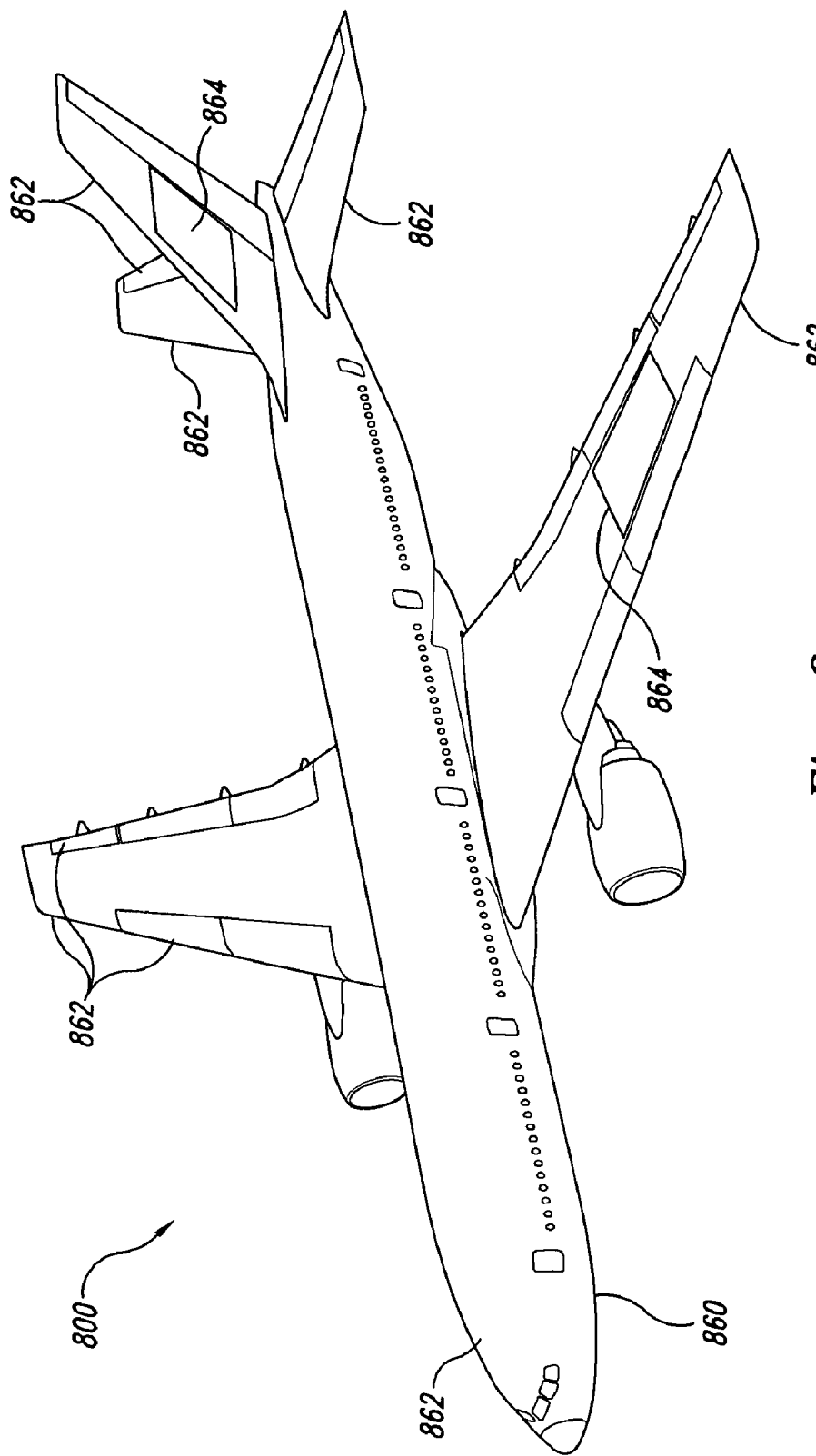
FIG. 8 is a partially schematic, isometric view of a structural system including at least one composite sheet, and at least one elongated metallic stiffening member forming a portion of a vehicle in accordance with further embodiments of the invention.

FIG. 8 shows a structural system 800 incorporated into a vehicle 860 (e.g., an aircraft) in accordance with another embodiment of the invention. The vehicle 860 can have multiple external flow bodies 862 or portions of flow bodies (e.g., wing portions, a fuselage portion, a vertical tail portion, horizontal tail portions, engine nacelle(s), engine pylon (s), and/or control surface(s)). Portions 864 (e.g., sheets or panels) of the flow bodies 862 can include a composite sheet attached to an elongated metallic stiffening member. For purposes of illustration, only two portions 864 of the flow bodies 862 are shown in FIG. 8, one as a wing panel and the other as a horizontal tail panel. Composite sheets and elongated metallic stiffening members can also be used in/on other parts of the vehicle, for example, to construct internal vehicle structures.

From the foregoing, it will be appreciated that specific embodiments of the invention have been described herein for the purposes of illustration, but that various modifications may be made without deviating from the spirit and scope of the invention. Features described above in the context of particular embodiments can be combined or eliminated in other embodiments. For example, some or all aspects of the foregoing embodiments are not limited to use on vehicles and embodiments of the invention can be used in various other types of structures (e.g., building structures and other supports). Accordingly, the invention is not limited except by the following claims.

We claim:

1. A structural system, comprising:
   a composite sheet having a first surface facing a first direction and a second surface facing a second direction at least approximately opposite the first direction;
   an elongated metallic stiffening member having a transverse flange, the elongated metallic stiffening member being attached to the first surface of the composite sheet and positioned to resist bending of the composite sheet; and an elongated composite element attached to the metallic stiffening member, wherein:
   (A) the transverse flange of the elongated metallic stiffening member is attached directly to the first surface of the composite sheet via an adhesive; or
   (B) the transverse flange is attached directly the elongated composite element via an adhesive and the elongated composite element is attached directly to the first surface of the composite sheet via an adhesive.

2. The system of claim 1 wherein the second surface of the composite sheet forms a portion of an external flow body.

3. The system of claim 1 wherein the second surface of the composite sheet forms an exterior surface of a wing panel of an aircraft.

4. The system of claim 1 wherein the metallic stiffening member includes an elongated titanium member.

5. The system of claim 1 wherein the metallic stiffening member is elongated along a first axis and the elongated composite element is elongated along a second axis with filaments oriented generally parallel to the second axis, and wherein the composite element is attached to the metallic stiffening member so that the first and second axes are at least approximately parallel.

6. The system of claim 1 wherein the elongated composite element includes an elongated carbon boron fiber element.

7. The system of claim 1 wherein the composite sheet includes a carbon fiber sheet.

8. The system of claim 1 wherein the metallic stiffening member is elongated along an axis and wherein at least a portion of the metallic stiffening member extending generally along the axis and at least approximately perpendicular to the first surface of the composite sheet extends in and out of a flat plane extending along the axis and at least approximately perpendicular to the first surface of the composite sheet.

9. The system of claim 1 wherein the metallic stiffening member is elongated along an axis and wherein a portion of the metallic stiffening member extending generally along the axis and at least approximately perpendicular to the first surface of the composite sheet describes a sinusoidal shape.

10. The system of claim 1 wherein the first surface of the composite sheet has a curved section and wherein at least a portion of the elongated metallic stiffening member is at least approximately conformed to at least a portion of the curved section.

11. The system of claim 1 wherein the metallic stiffening member is adhesively attached to the composite sheet in a generally continuous manner.

12. The system of claim 1 wherein the composite sheet includes a first composite sheet and wherein the system further comprises a second composite sheet attached to the elongated metallic member opposite the first composite sheet.

13. The system of claim 1, further comprising a vehicle, the vehicle including the composite sheet, the elongated composite element, and the metallic stiffening member.

14. A structural system, comprising:
   a composite sheet having a first surface facing a first direction and a second surface facing a second direction at least approximately opposite the first direction, with no honeycomb stiffening arrangement attached to the composite sheet; and
   an elongated metallic stiffening member having at least one web and at least one transverse flange, the transverse flange being directly attached to the first surface of the composite sheet via an adhesive, the elongated metallic stiffening member being positioned to resist bending of the composite sheet.

15. The system of claim 14 wherein the second surface of the composite sheet forms a portion of an external flow body.

16. The system of claim 14 wherein the metallic stiffening member includes multiple metallic portions coupled together to form the at least one web and the at least one transverse flange.

17. The system of claim 14, further comprising an elongated composite element attached to the metallic stiffening member.

18. The system of claim 14 wherein the composite sheet includes a first composite sheet and wherein the system further comprises a second composite sheet attached to the elongated metallic member opposite the first composite sheet, the second composite sheet having no attached honeycomb stiffening arrangement.

19. The system of claim 14, further comprising a vehicle, the vehicle including the composite sheet and the metallic stiffening member.

20. An aircraft, comprising:
a fuselage portion;
a wing portion;
at least one control surface, with the wing portion, the fuselage portion, and the at least one control surface forming at least part of an external flow body of the aircraft, the external flow body including:
a composite skin having a first surface facing a first direction and a second surface facing a second direction at least approximately opposite the first direction;
a metallic stiffener having a transverse flange, the metallic stiffener being attached to the first surface of the skin and positioned to resist bending of the composite skin; and
an elongated composite element attached to the metallic stiffener, wherein:
(A) the transverse flange of the metallic stiffener is attached directly to the first surface of the skin via an adhesive; or
(B) the transverse flange is attached directly the elongated composite element via an adhesive and the elongated composite element is attached directly to the first surface of the skin via an adhesive.

21. The system of claim 20 wherein:
the metallic stiffener includes a titanium stiffener;
the composite skin includes a carbon fiber skin; and
the elongated composite element includes a carbon boron fiber element.

22. An aircraft, comprising:
a fuselage portion;
a wing portion;
at least one control surface, with the wing portion, the fuselage portion, and the at least one control surface forming at least part of an external flow body of the aircraft, the external flow body including:
a composite skin having a first surface facing a first direction and a second surface facing a second direction at least approximately opposite the first direction, the composite skin having no attached honeycomb stiffening arrangement; and
a metallic stiffener having at least one web and at least one transverse flange, the transverse flange being directly attached to the first surface of the skin via an adhesive, the metallic stiffener being positioned to resist bending of the composite skin.

23. The system of claim 22 wherein:
the metallic stiffener includes a titanium stiffener; and
the composite skin includes a carbon fiber skin.

24. A method for producing a structural system, comprising:
providing a composite sheet having a first surface facing a first direction and a second surface facing a second direction at least approximately opposite the first direction;
positioning an elongated metallic stiffening member having a transverse flange at least proximate to the first surface of the composite sheet;
attaching the metallic stiffening member to the first surface of the composite sheet; and
attaching an elongated composite element to the metallic stiffening member,
wherein:
(A) the transverse flange of the metallic stiffener is attached directly to the first surface of the skin via an adhesive: or
(B) the transverse flange is attached directly the elongated composite element via an adhesive and the elongated composite element is attached directly to the first surface of the skin via an adhesive.

25. The method of claim 24, further comprising forming a portion of an external flow body with the second surface of the composite sheet.

26. The method of claim 24, further comprising:
forming a wing panel with the composite sheet, the elongated metallic stiffening member, and the elongated composite element; and
installing the wing panel on an aircraft.

27. The method of claim 24 wherein positioning an elongated metallic stiffening member includes positioning an elongated titanium member.

28. The method of claim 24 wherein positioning a metallic stiffening member includes positioning a metallic stiffening member having multiple metallic portions coupled together to form the at least one web and the at least one transverse flange.

29. The method of claim 24 wherein positioning a metallic stiffening member includes positioning a metallic stiffening member that is elongated along an axis and attaching an elongated composite element includes attaching an elongated composite element having filaments, and wherein the method further comprises orienting the filaments of the elongated composite element to extend at least approximately parallel to the axis along which the metallic stiffening member is elongated.

30. The method of claim 24 wherein attaching an elongated composite element includes attaching an elongated carbon boron fiber element to the elongated metallic stiffening member.

31. The method of claim 24 wherein providing a composite sheet includes providing a carbon fiber sheet.

32. The method of claim 24 wherein positioning a metallic stiffening member includes positioning a metallic stiffening member that is elongated along an axis and wherein a portion of the metallic stiffening member extending generally along the axis and at least approximately perpendicular to the first surface of the composite sheet extends into and out of a flat plane extending along the axis and at least approximately perpendicular to the first surface of the composite sheet.

33. The method of claim 24 wherein positioning an elongated metallic stiffening member includes positioning an elongated metallic stiffening member that is elongated along an axis and wherein a portion of the metallic stiffening member extending generally along the axis and at least approximately perpendicular to the first surface of the composite sheet describes a sinusoidal shape.

34. The method of claim 24 wherein attaching an elongated composite element includes adhesively attaching an elongated composite element to the elongated metallic stiffening member.

35. The method of claim 24, further comprising forming a vehicle that includes the composite sheet, an elongated metallic stiffening member, and an elongated composite element.

36. The method of claim 24 wherein providing a composite sheet includes providing a composite sheet having a first surface that is not flat, and wherein the method further comprises conforming the metallic stiffening member to at least a portion of the first surface.

37. The method of claim 24 wherein at least one of attaching the metallic stiffening member to the first surface and attaching an elongated composite element to the metallic stiffening member includes using an adhesive and applying heat during an adhesive curing process.

38. The method of claim 24 wherein at least one of attaching the metallic stiffening member to the first surface and attaching an elongated composite element to the metallic stiffening member includes using an adhesive and applying heat and pressure during an adhesive curing process.

39. The method of claim 24 wherein attaching the metallic stiffening member to the first surface includes adhesively attaching the metallic stiffening member to the first surface in a generally continuous manner.

40. The method of claim 24 wherein:
providing the composite sheet includes providing a first composite sheet; and attaching the metallic stiffening element to the first surface includes attaching the metallic stiffening member to the first surface of the first composite sheet, and wherein the method further comprises:
providing a second composite sheet;
positioning the elongated metallic stiffening member at least proximate to the second composite sheet; and
attaching the metallic stiffening member to the second composite sheet.

41. A method for producing a structural system, comprising:
providing a composite sheet having a first surface facing a first direction and a second surface facing a second direction at least approximately opposite the first direction, the composite sheet having no attached honeycomb stiffening arrangement;
positioning an elongated metallic stiffening member at least proximate to the first surface of the composite sheet, the metallic stiffening member having at least one web and at least one transverse flange; and
attaching the at least one transverse flange of the metallic stiffening member directly to the first surface of the composite sheet via an adhesive.

42. The method of claim 41, further comprising forming a portion of an external flow body with the second surface of the composite sheet.

43. The method of claim 41, further comprising attaching an elongated composite element to the metallic stiffening member.

44. The method of claim 41, further comprising forming a vehicle that includes the composite sheet and the elongated metallic stiffening member.

45. The method of claim 41 wherein:
providing the composite sheet includes providing a first composite sheet; and
attaching the at least one transverse flange of the metallic stiffening element to the first surface includes attaching the at least one transverse flange of the metallic stiffening member to the first surface of the first composite sheet, and wherein the method further comprises:
providing a second composite sheet, the second composite sheet having no attached honeycomb stiffening arrangement;
positioning the elongated metallic stiffening member at least proximate to the second composite sheet; and
attaching the metallic stiffening member to the second composite sheet.

\* \* \* \* \*